United States Patent [19]

Yasukawa et al.

[11] Patent Number: 5,145,892
[45] Date of Patent: Sep. 8, 1992

[54] POLYPROPYLENE RESIN COMPOSITION

[75] Inventors: Yoshiaki Yasukawa; Hiroyoshi Asakuno, both of Ichiharashi; Kinya Mori, Chibashi; Kenji Iwai, Ichiharashi, all of Japan

[73] Assignee: Chisso Corporation, Osaka, Japan

[21] Appl. No.: 237,139

[22] Filed: Aug. 26, 1988

Related U.S. Application Data

[63] Continuation of Ser. No. 939,742, Dec. 9, 1986, abandoned.

[30] Foreign Application Priority Data

Dec. 19, 1985 [JP] Japan .................................. 286531

[51] Int. Cl.$^5$ .............................................. C08K 3/34
[52] U.S. Cl. ...................................... 524/34; 524/449; 524/451; 524/456; 524/504; 524/505; 525/64; 525/92
[58] Field of Search ............... 524/34, 449, 451, 456, 524/504, 505; 525/64, 92

[56] References Cited

U.S. PATENT DOCUMENTS

| | | | |
|---|---|---|---|
| 4,176,097 | 11/1979 | Fox et al. | 524/451 |
| 4,507,423 | 3/1985 | Sasaki et al. | 524/451 |
| 4,546,128 | 10/1985 | Nakajima | 523/222 |
| 4,550,130 | 10/1985 | Kishida et al. | 524/451 |
| 4,550,144 | 10/1985 | Chiba et al. | 525/247 |
| 4,603,153 | 7/1986 | Sobajima et al. | 524/456 |
| 4,621,115 | 11/1986 | Morita et al. | 524/504 |
| 4,720,516 | 1/1988 | Kishida et al. | 524/451 |

FOREIGN PATENT DOCUMENTS

| | | | |
|---|---|---|---|
| 50058 | 4/1980 | Japan | 525/64 |
| 15544 | 1/1983 | Japan | 524/451 |
| 53550 | 3/1985 | Japan . | |
| 248765 | 12/1985 | Japan | 524/451 |
| 2057458 | 4/1981 | United Kingdom . | |

Primary Examiner—John C. Bleutge
Assistant Examiner—R. Dean
Attorney, Agent, or Firm—Fred Philpitt

[57] ABSTRACT

A polypropylene resin composition superior in rigidity, resistance to heat distortion, to secondary deformation, to sink mark forming and warpage deformation is provided which comprises a specified polypropylene-ethylene block copolymer and an organic fiber and an optionally added inorganic fiber, or a specified modified polypropylene-ethylene block copolymer and an organic fiber and an optionally added inorganic filler.

2 Claims, No Drawings

POLYPROPYLENE RESIN COMPOSITION

This is a continuation of application Ser. No. 939,742, filed Dec. 9, 1986, now abandoned.

BACKGROUND OF THE INVENTION

1. Field of the Invention This invention relates to a polypropylene resin composition. More particularly, it relates to a polypropylene resin composition, having mouldability which can provide moulded articles superior in rigidity, impact resistance and resistance to sink mark forming, if moulded articles are made therefrom.

With regard to the materials for interior automotive trims, appliance parts, parts of office automation machineries, etc. tendency of utilization of plastics is increasing lately, particularly from the viewpoint of their light weight and economical advantage. Among them polypropylene resin which is superior in moldability, economical aspect, appearance and shape, mechanical strength, resistance to climate (weatherability) and durability of moulded product, is desirably used.

However, interior automotive trims or appliance parts, etc. which are moulded by using conventionally known polypropylene resin have drawback because they have latent residual stress due to inner strain caused during the process of cooling after moulding and on this account, when an article using these parts is exposed to the atmosphere at a temperature of 70°–12° C. at the time of practical use, release of internal stress occurs, resulting in secondary deformation of the articles to which these parts are attached and losing value as articles of commerce. Further sink marks formed by shrinkage due to cooling process after moulding, bring about defect in spoiling the appearance of moulded articles.

In order to overcome these drawbacks, polypropylene to which an inorganic filler is incorporated, a so-called inorganic-filler-containing polypropylene resin is being used abundantly now. However, the use of such an inorganic-filler-containing polypropylene resin may improve the secondary deformation and sink mark forming but causes drawback in the point of lowering of impact strength of moulded articles and makes moulded articles brittle.

We, the inventors of this invention have made strenuous effort in study to improve the drawbacks of the above-mentioned polypropylene resin composition. As the result, to be astonishing enough, we have found that a composition formed by blending a prescribed amount of organic fibers or a prescribed amount of organic fibers and an inorganic filler with propylene-ethylene block copolymer modified with an unsaturated carboxylic acid or its derivative have good moldability and when it is made into moulded articles, it provides moulded articles superior in rigidity, resistance to impact, and to sink mark forming and based upon this finding, we completed the present invention.

As evident from the foregoing description, the object of the present invention is to provide a polypropylene resin composition, having good moldability which can produce a shaped articles, superior in rigidity, impact resistance and capability of prevention of sink mark forming.

SUMMARY OF THE INVENTION

The present invention has a following constitution:

(b 1) A polypropylene resin composition formed by blending 20–50% by weight of organic fiber with a modified propylene-ethylene block copolymer having an ethylene content of 3–20% by weight, which is obtained by modifying with an unsaturated carboxylic acid or its derivative.

(2) A polypropylene resin composition formed by blending 20–50% by weight of organic fibers and 5–30% by weight of an inorganic filer with a modified propylene-ethylene block copolymer having an ethylene content of 3–20% by weight, which is obtained by modifying with an unsaturated carboxylic acid or its derivative.

The modified propylene-ethylene block copolymer can be produced by a known process, i.e. by reacting a propylene-ethylene block copolymer having an ethylene content of 3–20% by weight, and a melt flow rate (weight of melted resin delivered for 10 minutes under a load of 2.16 Kg at 230° C.) of 0.5–50 g/10 minutes, with an unsaturated carboxylic acid or its derivative in a solvent, or in the melted state and the presence of a peroxide.

As an unsaturated carboxylic acid or its derivative used in the present invention, acrylic acid, methacrylic acid, maleic acid, itaconic acid, fumaric acid, citroconic acid, esters of these acids, maleic anhydride, citraconic anhydride, itaconic anhydride, etc. are illustrated. Particularly, it is preferable to use maleic anhydride or a glycidyl ester of methacrylic acid.

The amount of unsaturated carboxylic acid or its derivative to be used is in the range of 0.05–15% by weight, preferably 0.05–10% by weight, most preferably 0.05–5% by weight relative to the raw material resin.

The modified propylene-ethylene block copolymer is intended to include above-mentioned modified propylene ethylene block copolymer as well as a mixture thereof with its raw material resin unmodified propylene block copolymer.

As for the organic fibers useful in the present invention, there is no special limitation except the condition that those which do not decompose, or melt at the time of melting and kneading or moulding, should be used. For example, polyamide type fibers, polyester type fibers, polyimido fibers, polyvinyl alcohol type fibers, polyvinylidene type fibers, super high strength polyethylene fibers polyacrylonitrile type fibers, polyurethane type fibers, polyalkylene paraoxybenzoate type fibers, carbon fibers, phenol type fibers, rayon fibers, acetate fibers, cotton fibers, flax fibers, ramie fibers, jute fibers, wool fibers, silk fibers, a mixture of two or more of these fibers can be used. Particularly, preferable is polyamide type fibers, polyester type fibers, cotton fibers and a mixture of the above-mentioned two or more fibers. As for the shape of the organic fibers, there is no particular limitation. Any of those having thread shape, woven or knitted material shape, non-woven fiber shape can be useful. It is preferable for those having woven or knitted material shape and non-woven fiber shape, to be used after separating into monofilaments in advance. Further, as for the length of the organic fibers used, it is preferable to use those having a length cut to 1–50 mm, more preferable to 1–30 mm. Those having a length of 1–10 mm, are most preferable. As for the thickness of the organic fibers used, 0.5–20 denier fibers are preferable, 1–10 denier fibers are more preferable and 1–5 denier fibers are most preferable.

The amount of organic fibers to be blended is 20–50% by weight. More preferably, it is 30–50% by weight. If the amount to be blended is less than 20% by weight, it is not preferable because rigidity and resistance to sink mark forming are lowered. It does not matter even if it is over 50% by weight, but a further improvement of the above-mentioned effectiveness is not recognized and it is not preferable because fluidity of molten resin is lowered and moldability is lowered.

The inorganic fillers used in the present invention, are powdery inorganic fillers, such as talc, calcium carbonate, calcium hydroxide, mica, barium sulfate, calcium silicate, clay, silica, alumina wollastonite, magnesium carbonate, magnesium hydroxide, iron oxide, zinc oxide, titanium oxide, gypsum powder, a mixture of two or more of these can be mentioned. Particularly talc is preferable.

The amount of the inorganic filler to be blended varies according to the degree of improvement of rigidity and resistance to heat distortion required for the moulded articles but it is usually 5–30% by weight, and most preferably 10–20% by weight. If the amount to be blended is less than 5% by weight, the effectiveness of blending an inorganic filler is not exhibited. If it is over 30% by weight, rigidity and resistance to heat distortion is improved but it is not preferable because impact strength is lowered.

Various kinds of additives which are added to an ordinary polypropylene resin in case of necessity, such as antioxidant, antistatic agent, ultraviolet absorber, anti-copper agent, colorant, etc. can be used as the occasion may demand, at the same time.

The production of the composition of the present invention is carried out by feeding e.g. each various predetermined amount of pellets of modified propylene-ethylene block copolymer and an organic fiber or pellets of modified propylene-ethylene block copolymer, an organic fiber and an inorganic filler to a Henschel mixer (trade name), a super mixer or the like, followed by heating and kneading at a temperature of 170° C.–230° C. with stirring, or by melting and kneading a predetermined amount of the above-mentioned blending components in a banbury mixer, a roll, a single screw or a twin screw extruder or co-kneader to pelletize them.

In the production of the composition of the present invention, it is necessary to do heating, and kneading with stirring or melting, and kneading in such a way that the above-mentioned organic fibers blended at the time of heating and kneading with stirring, or melting and kneading, do not melt or decompose.

In the production of the composition of the present invention, it is necessary to take care that the blended organic fibers do not melt or do not decompose at the time of the above-mentioned heating with stirring and kneading or melting and kneading, in other words, to take care that heating with kneading or melting with kneading be carried out with holding the original form. For that purpose, as for temperature for heating with stirring and kneading or a temperature for melting and kneading, it is to be in the range of 170°–230° C., preferably 180°–200° C., most preferably 180°–190° C. It is necessary to take care not to make the blended organic fibers melt or decompose at a temperature of moulding processing when molding processing is carried out according to various molding processes by using the composition of the present invention. For that purpose, a temperature lower than 230° C. is preferable as a processing temperature for molding.

The polypropylene composition of the present invention can be used in producing various kinds of molding articles, depending upon the purpose.

The molding articles produced by using the polypropylene resin composition of the present invention, are superior to the molding articles made by using an ordinary unmodified polypropylene resin incorporated with an organic fiber and/or an inorganic filler, in rigidity, impact resistance, and resistance to sink mark forming and can be used suitably in various fields such as interior automotive trims, appliance parts, parts of office automation machineries, etc.

The present invention will be more fully explained by way of specific examples and comparative examples. The evaluation methods used in the specific examples and comparative examples are those described below.

(A) Rigidity

Measurements of flexural modulus, bending strength (according to JIS K 7203) and tensile strength (according to JIS K 7113) at a temperature of 23° C.

(B) Impact resistance

Measurement of Izod impact strength (according to JIS K 7110) and measurement of du-Pont impact strength at a temperature of 23° C. according to the following method.

After a test piece molded by injection molding process into a length of 50 mm, a width of 50 mm and a thickness of 2 mm is subjected to conditioning by allowing to stand under a temperature of 23° C. ±1° C. and a relative humidity of 50% for 48 hours, and by using a du-Pont impact tester having a R (curvature) of the pointed end of hammering weight of 0.25 in. and an inside diameter of the hammering weight receiver of 1.5 in. a height of falling weight of 1 m and a weight of 100 g – 5000 g, a weight is pursued at the time of 50% breakage of the test pieces by falling the weight from a height of 1 m under the condition of temperature of 23° C. ±1° C. and relative humidity of 50% and an impact strength (unit Kg.cm) was calculated by multiplying a height of fall of weight (100 cm).

(C) Measurement of sink mark

A test piece having a shape of ⊥, formed by erecting a rib having a thickness of 3 mm and a height of 5 mm in the direction perpendicular to a flat plate (90 mm long, 90 mm wide and 2 mm thick) is molded by injection molding process at a resin temperature of 200° C. and the flat plate is observed from the opposite side to the rib-fixed side with naked eyes and the state of forming of sink marks is judged according to the following standard.

o sink marks are not recognizable and surface state is good x sink marks are notable and surface state is not good

EXAMPLES 1–8 AND COMPARATIVE EXAMPLES 1–6

For examples 1–3, propylene-ethylene block copolymer having a melt flow rate (MFR, an extruded amount of melted resin at a temperature of 230° C., under a load of 2.16 Kg for 10 minutes) of 15 g/10 min. and ethylene content of 8.5% by weight, and 0.4% by weight of maleic anhydride in the presence of an organic peroxide were melted, kneaded and extruded to produce pellets of a modified propylene-ethylene block copolymer (which will be referred to as modified P-E block copolymer 1) having a MFR 50 g/10 min.

Resultant pellets of modified P-E block copolymer 1 and organic fibers, having a fiber length 3 m, obtained by shredding and integrating woven mixed-spun fabrics consisting of 1.5 denier 65% by weight of polyester and 5% by weight of cotton were charged into a Henschel mixer (trade name) at a blending proportion described in Table 1 hereinafter described and prescribed amount of each blending component and pellet-form composition was obtained by heating with mixing and kneading at a temperature of 180° C. for 10 minutes.

For examples 4-6, pellets of the modified propylene-ethylene block copolymer (which will be referred to as modified propylene ethylene copolymer 2) having a MFR of 50 g/10 min. obtained by melting, kneading and extruding propylene-ethylene block copolymer having a MFR of 15 g/10 min. and ethylene content of 8.5% by weight and 0.5% by weight of glycidyl ester of metha-acrylic acid in the presence of an organic peroxide were charged to a Henschel mixer (trade name) together with an organic fiber the same with the one used in examples 1-3 according to the blending ratio described in the Table 1 described hereinafter and in prescribed amounts of each blending components and pellet-form compositions were obtained by heating with stirring and kneading according to the procedure of examples 1-3.

For examples 7-8, the pellets of the same modified P-E block copolymer 1 as used in examples 1-3 and the same modified P-E block copolymer 2 as used in example 4-6, and the same organic fibers as used in examples 1-3 were charged to a Henschel mixer (trade name) according to the blending ratio described in the Table 1 hereinafter and in prescribed amounts of each blending components and pellet-form compositions were obtained by heating with stirring and kneading according to the procedure of examples 1-3, in case of example 7.

A mixture of the pellets of the same modified P-E block copolymer 2 as used in examples 4-6 and the pellets of unmodified P-E block copolymer having a MFR of 15 g/10 min. and ethylene content of 8.5% by weight which is a raw material of the above-mentioned modified P-E and the same organic fibers as used in examples 1-3 were charged to a Henschel mixer (trade name) according to the blending ratio described in Table 1 hereinafter and in prescribed amount of each blending component and pellet-form compositions were obtained by heating with stirring and kneading according to the procedure of examples 1-3, in case of example 8.

For comparative examples 1-6, the pellets of the same unmodified P-E block copolymer as used in example 8 and the same organic fibers as used in examples 1-3 were charged to a Henschel mixer (trade name) according to the blending ratio described hereinafter in Table 1 and in prescribed amount of each blending component and pellet form compositions were obtained by heating with stirring and kneading according to the procedure of examples 1-3.

For comparative examples 1-6, the pellets of the same unmodified P-E block copolymer as used in example 8 and the same organic fiber as used in examples 1-3 were charged to a Henschel mixer. (trade name) according to the blending rate described in Table 1 and in prescribed amount of each blending component and pellet-form compositions were obtained by heating with stirring and kneading according to the procedure of examples 1-3, in case of comparative examples.

The pellets of propylene homopolymer having a MFR of 20 g/10 min. and the same organic fibers as used in examples 1-3 in case of comparative example 5 and a mixture of the pellets of propylene homopolymer as above-mentioned and the pellets of the same unmodified propylene-ethylene block copolymer as used in example 8 and the same organic fibers as used in examples 1-3 in case of comparative example 6 were charged to a Henschel mixer (trade name) according to the blending ratio described in Table 1 and in the prescribed amount of each blending component and pellet-form compositions were obtained by heating with stirring and kneading according to the procedure of examples 1-3.

By using the pellets obtained in examples 1-8 and comparative examples 1-6, various kinds of test pieces having prescribed shapes were prepared by injection molding at a resin temperature of 200° C. With regard to the prepared test pieces, flexural modulus, bending strength, tensile strength, du-Pont impact strength, Izoid impact strength and sink marks were measured. These results are summarized and shown in Table 1.

EXAMPLES 9-10 AND COMPARATIVE EXAMPLES 7-8

In example 9, a mixture of pellets of the same modified P-E block copolymer 1 as used in example 7 and modified P-E block copolymer 2 and the same organic fibers as used in examples 1-3 and talcs having an average particle diameter of 2 $\mu$ were charged to a Henschel mixer (trade name) according to the blending ratio described hereinafter in Table 1 in prescribed amount of each blending components, and in example 10, a mixture of pellets of the same unmodified P-E block copolymer as used in example 7 and pellets of the same modified P-E block copolymer 2, as used in examples 4-6 together with organic fibers and talc similarily as in example 9 were charged to a Henschel mixer (trade name) according to the blending ratio described hereinafter in Table 1 and in prescribed amount of each blending component and pellet-form compositions were obtained by heating with stirring and kneading according to the procedure of examples 1-3.

Further, for comparative examples 7-8, pellets of the same unmodified P-E block copolymer as used in examples 8 and 10 and the same organic fiber as used in examples 1-3 and the same talc as used in examples 9-10 in case of comparative example 7, and a mixture of pellets of the same propylene homopolymer as used in comparative examples 5-6 and pellets of the same unmodified propylene-ethylene block copolymer as used in examples 8 and 10, the same organic fibers and talc as used in comparative example 7 were charged to a Henschel mixer (trade name) according to the blending ratio hereinafter described in Table 1 in prescribed amounts of each blending components were charged to a Henschel mixer (trade name) and heated with stirring and kneading according to the procedure of examples 1-3, to obtain pellet-form compositions in case of comparative example 8.

With regard to the pellets obtained in examples 9-10 and comparative examples 7-8, various kinds of test pieces were prepared according to the procedures of examples 1-8 and measurements of flexural modulus bending strength, tensile strength, du-Pont impact strength, Izod impact strength and sink marks were carried out according to the procedure of examples 1-8.

EXAMPLES 11-12 AND COMPARATIVE EXAMPLES 9-10

For specific examples 11-12, pellets of modified P-E block copolymer 1 and nylon 66 fibers having a diameter of 1.5 denier and a length of 3 mm in case of example 11, and pellets of modified P-E block copolymer 2 and nylon 66 fibers the same with those used in example 11 in case of example 12 were charged to a Henschel mixer (trade name) according to the blending ratio described hereinafter in Table 1, and in prescribed amounts of each blending components were charged to a Henschel mixer (trade name) and by heating with stirring and kneading according to the procedure of examples 1-3, pellet-form compositions were obtained.

For comparative examples 9-10, pellets of unmodified propylene-ethylene block copolymer and nylon 66 fibers having a diameter of 1.5 denier and a length of 3 mm were charged to a Henschel mixer (trade name) according to the blending ratio described in Table 1 and in prescribed amounts of each blending components and pellet-form compositions were obtained according to the procedures of examples 1-3.

With regard to the pellets obtained in examples 11-12 and comparative examples 9-10 the measurements of flexural modulus, bending strength, Izod impact strength and sink marks were carried out according to the procedures of examples 1-8. The results obtained are indicated in Table 1.

As evident from Table 1, it is understandable that the moulded articles obtained in each examples in which the compositions of the present invention are used, are superior in rigidity (flexural modulus, bending strength, tensile strength) impact resistance (du-Pont impact strength, and Izod impact strength) and resistance to sink marks. In contrast, the moulded articles obtained in the comparative examples 1-5, in which unmodified P-E copolymers or unmodified propylene homopolymers blended with organic fibers are inferior in rigidity, and impact resistance and provide problem in actual use.

It is seen further that the moulded articles obtained in comparative examples 7-8 in which an unmodified P-E block copolymer or a mixture of the above-mentioned block copolymer and an unmodified propylene homopolymer is blended with an organic fibers and talc are inferior to the moulded articles obtained in example 9 or example 10 in which modified P-E block copolymer or a mixture of the above-mentioned modified block copolymer and unmodified P-E block copolymer blended with organic fibers and talc.

It is seen further that in case where nylon 66 is used, the moulded articles in which the composition of the present invention are used, are extremely superior in rigidity, impact resistance and resistance to sink mark forming as well as in case where a mixture of polyester fibers and cotton fibers is used.

As described above it has become clear that the moulded articles obtained by using the compositions of the present invention are extremely superior in rigidity, impact resistance, and resistance to sink mark forming and can be used suitably in various kinds of interior automotive trims, appliance parts, parts of office automation machineries, etc.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Blending ratio (wt. %) | | | | | | | | | | | | |
| Propylene homopolymer | — | — | — | — | — | — | — | — | — | — | — | — |
| Propylene-ethylene block copolymer | — | — | — | — | — | — | — | 20 | — | 30 | — | — |
| Modified propylene-ethylene block copolymer 1 | 80 | 70 | 60 | — | — | — | 35 | — | 30 | — | 60 | — |
| Modified propylene-ethylene block copolymer 2 | — | — | — | 80 | 60 | 50 | 35 | 50 | 30 | 30 | — | 60 |
| Organic fibers | 20 | 30 | 40 | 20 | 40 | 50 | 30 | 30 | 20 | 20 | 40 | 40 |
| Talc | — | — | — | — | — | — | — | — | 20 | 20 | — | — |
| Flexural modulus (Kgf/cm$^2$) | 15000 | 19000 | 23500 | 15500 | 23500 | 27000 | 19500 | 18500 | 29000 | 28000 | 22500 | 23000 |
| Bending strength (Kgf/cm$^2$) | 370 | 400 | 410 | 380 | 440 | 450 | 460 | 380 | 530 | 430 | 430 | 450 |
| Tensile strength (Kgf/cm$^2$) | 290 | 350 | 330 | 290 | 350 | 350 | 380 | 310 | 400 | 340 | 350 | 360 |
| du-Pont impact strength 23° C. (Kgf-cm) | 18 | 16 | 15 | 20 | 16 | 12 | 20 | 14 | 12 | 10 | 17 | 18 |
| Izod impact strength (Kgf-cm/cm) | 10 | 12 | 13 | 11 | 15 | 14 | 13 | 11 | 13 | 12 | 15 | 17 |
| Sink marks | O | O | O | O | O | O | O | O | O | O | O | O |

| | Comparative example | | | | | | | | | |
|---|---|---|---|---|---|---|---|---|---|---|
| | 1 | 2 | 3 | 4 | 5 | 6 | 7 | 8 | 9 | 10 |
| Blending ratio (wt. %) | | | | | | | | | | |
| Propylene homopolymer | — | — | — | — | 70 | 35 | — | 30 | — | — |
| Propylene-ethylene block copolymer | 90 | 80 | 70 | 50 | — | 35 | 60 | 30 | 60 | 50 |
| Modified propylene-ethylene block copolymer 1 | — | — | — | — | — | — | — | — | — | — |
| Modified propylene-ethylene block copolymer 2 | — | — | — | — | — | — | — | — | — | — |
| Organic fibers | 10 | 20 | 30 | 50 | 30 | 30 | 20 | 20 | 40 | 50 |
| Talc | — | — | — | — | — | — | 20 | 20 | — | — |
| Flexural modulus (Kgf/cm$^2$) | 12000 | 14000 | 18000 | 24500 | 23000 | 20000 | 28000 | 31000 | 22500 | 25000 |
| Bending strength (Kgf/cm$^2$) | 300 | 290 | 330 | 340 | 400 | 370 | 350 | 410 | 310 | 320 |
| Tensile strength (Kgf/cm$^2$) | 230 | 210 | 250 | 220 | 350 | 330 | 300 | 320 | 210 | 190 |
| du-Pont impact strength 23° C. (Kgf-cm) | 9.5 | 6.3 | 5.8 | 4.5 | 3.0 | 3.5 | 5.0 | 4.4 | 5.0 | 4.5 |
| Izod impact strength (Kgf-cm/cm) | 5.6 | 6.1 | 8.4 | 8.3 | 2.5 | 2.7 | 4.3 | 3.3 | 8.0 | 7.7 |

TABLE 1-continued

| | | | | | | | | | | |
|---|---|---|---|---|---|---|---|---|---|---|
| Sink marks | X | O | O | O | O | O | O | O | O | O |

What is claimed is:

1. A resin composition consisting essentially of a blend of a propylene-ethylene block copolymer containing 3–20% by weight of ethylene, modified with an unsaturated carboxylic acid selected from the group consisting of acrylic acid, methacrylic acid, maleic acid, itaconic acid, fumaric acid, and citraconic acid, or an unsaturated carboxylic acid derivative selected from the group consisting of esters of the foregoing acids, maleic anhydride, citraconic anhydride and itaconic anhydride, an 20-5-% by weight based on the total weight of the composition of an organic fiber selected from the group consisting of polyester fibers, cotton fibers and a mixture of these two fibers, and 5–30% by weight of an inorganic filler selected from the group consisting of talc, mica, wollastonite and a mixture of two or more of the foregoing members.

2. A resin composition consisting essentially of a blend of (i) a modified propylene-ethylene block copolymer obtained by modifying propylene-ethylene block copolymer containing 3–20% by weight of ethylene, with an unsaturated carboxylic acid selected from the group consisting of acrylic acid, methacrylic acid, maleic acid, itaconic acid, fumaric acid and citraconic acid or with an unsaturated carboxylic acid derivative selected from the group consisting of esters of the foregoing acids, maleic anhydrides, citraconic anhydride and itaconic anhydride, and 20–50% by weight based on the total weight of the composition of an organic fiber selected from the group consisting of polyester fibers, cotton fibers and a mixture of these two fibers.

* * * * *